(12) United States Patent
Yamamoto et al.

(10) Patent No.: US 12,037,835 B2
(45) Date of Patent: Jul. 16, 2024

(54) WINDOW REGULATOR

(71) Applicant: AISIN CORPORATION, Kariya (JP)

(72) Inventors: Kenji Yamamoto, Fujisawa (JP);
Tatsuro Torimoto, Fujisawa (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/904,519

(22) PCT Filed: Feb. 19, 2021

(86) PCT No.: PCT/JP2021/006300
§ 371 (c)(1),
(2) Date: Aug. 18, 2022

(87) PCT Pub. No.: WO2021/172186
PCT Pub. Date: Sep. 2, 2021

(65) Prior Publication Data
US 2023/0081555 A1    Mar. 16, 2023

(30) Foreign Application Priority Data

Feb. 26, 2020   (JP) ................... 2020-030155

(51) Int. Cl.
*E05F 15/689*   (2015.01)
*E05F 11/48*    (2006.01)

(52) U.S. Cl.
CPC .......... *E05F 15/689* (2015.01); *E05F 11/483* (2013.01); *E05Y 2201/684* (2013.01);
(Continued)

(58) Field of Classification Search
None
See application file for complete search history.

(56) References Cited

U.S. PATENT DOCUMENTS 10,753,137 B2 *   8/2020   Muramatsu ........... E05F 11/382
11,136,803 B2    10/2021   Yamamoto et al.
(Continued)

FOREIGN PATENT DOCUMENTS

| CN | 111098678 A | 5/2020 |
|----|-------------|--------|
| JP | H08-004411 A | 1/1996 |
| JP | 2017133228 A | 8/2017 |

OTHER PUBLICATIONS

International Search Report (PCT/ISA/210) with English translation and Written Opinion (PCT/ISA/237) dated May 11, 2021, by the Japanese Patent Office as the International Searching Authority for International Application No. PCT/JP2021/006300.
(Continued)

*Primary Examiner* — Marcus Menezes
(74) *Attorney, Agent, or Firm* — BUCHANAN INGERSOLL & ROONEY PC

(57) ABSTRACT

A window regulator has a guide rail extending in a drive direction of a window glass, and a slider supporting the window glass and supported on the guide rail so as to slide in the drive direction. In the window regulator, the guide rail has a grease application region extending in the drive direction, and the slider has multiple grease application portions provided along the drive direction to apply grease in a stepwise manner to the grease application region.

11 Claims, 18 Drawing Sheets

(52) U.S. Cl.
CPC ... *E05Y 2201/708* (2013.01); *E05Y 2800/108* (2013.01); *E05Y 2900/55* (2013.01)

(56) References Cited

U.S. PATENT DOCUMENTS

| | | | | |
|---|---|---|---|---|
| 11,136,810 B2* | 10/2021 | Yamamoto | ............ | E05F 11/382 |
| 11,286,704 B2* | 3/2022 | Takaoka | ................ | E05F 11/385 |
| 2002/0014039 A1* | 2/2002 | Merlet | .................. | E05F 11/382 |
| | | | | 49/440 |
| 2019/0048641 A1* | 2/2019 | Muramatsu | ........... | E05F 15/697 |
| 2020/0131823 A1* | 4/2020 | Yamamoto | ............ | E05F 11/382 |
| 2020/0131834 A1* | 4/2020 | Yamamoto | ............ | E05F 11/483 |
| 2020/0406726 A1* | 12/2020 | Kimura | ...................... | B60J 1/17 |
| 2020/0408026 A1* | 12/2020 | Takaoka | ................ | E05F 15/689 |

OTHER PUBLICATIONS

Office Action (Notice of First Examination Opinion) dated Sep. 14, 2023, by the State Intellectual Property Office of People's Republic of China in corresponding Chinese Patent Application No. 202180008888.1 and an English translation of the Office Action. (25 pages).

* cited by examiner

FIG. 4
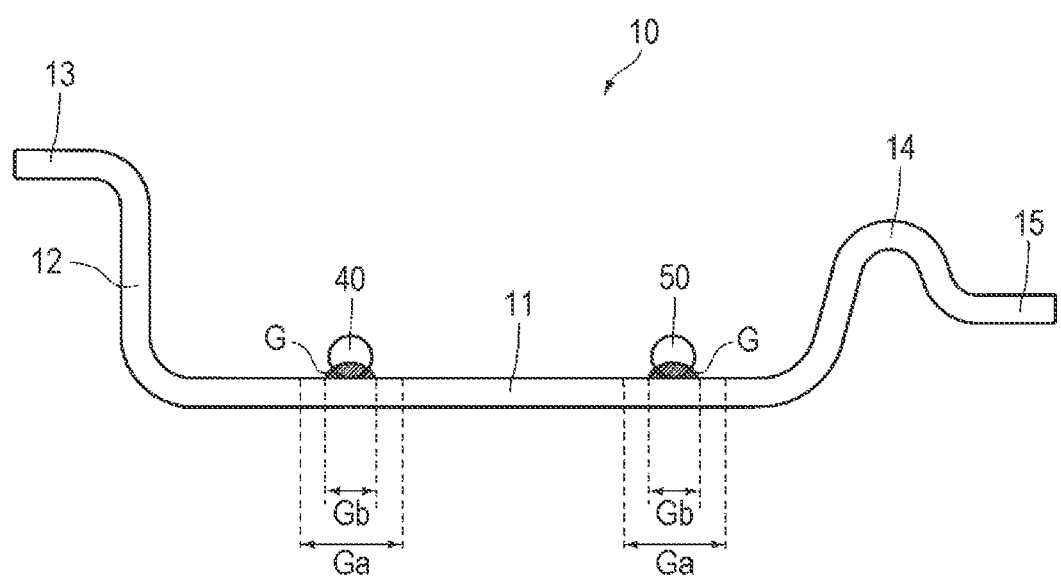
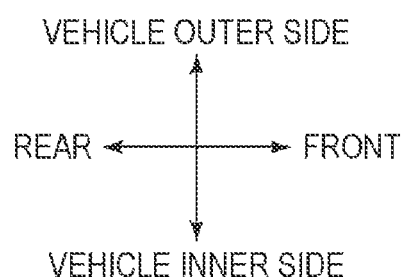

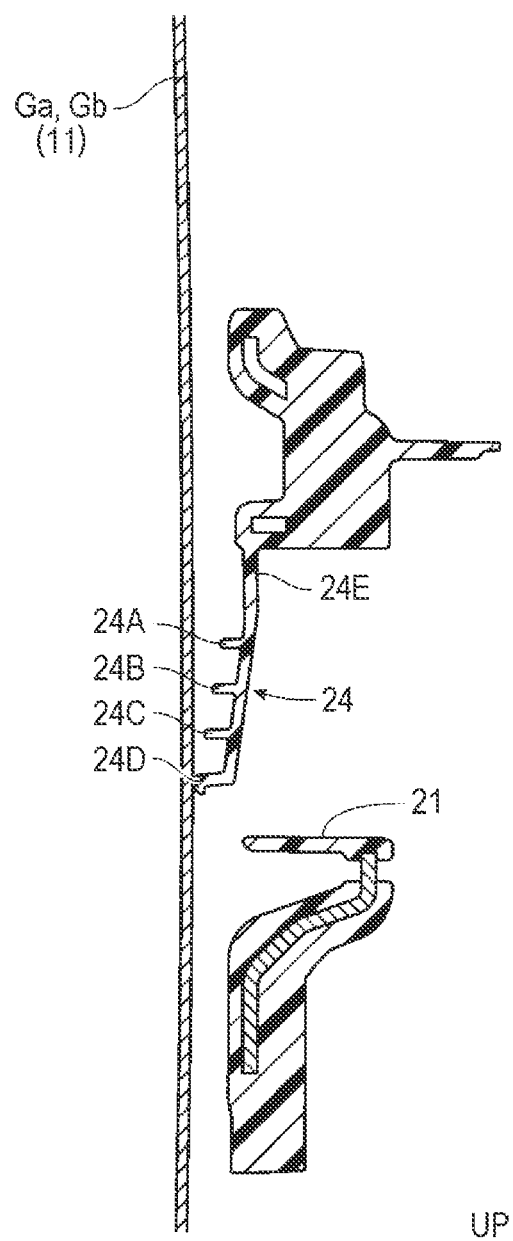
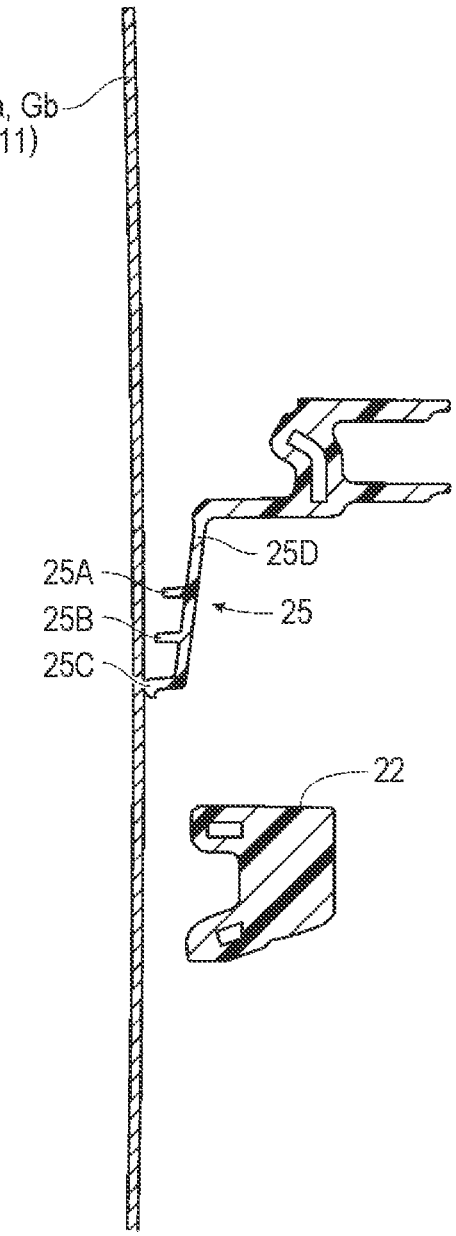

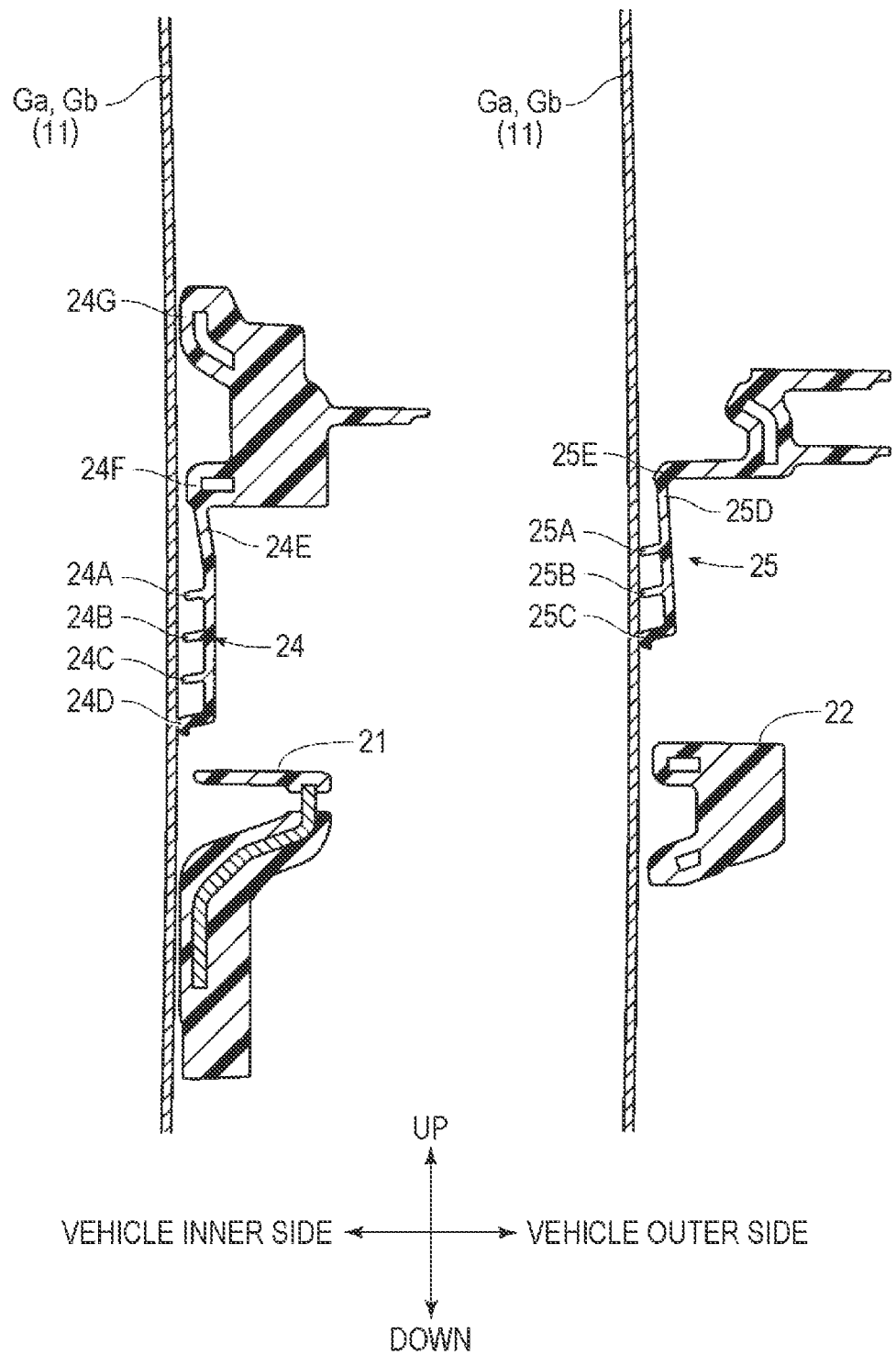

FIG. 9
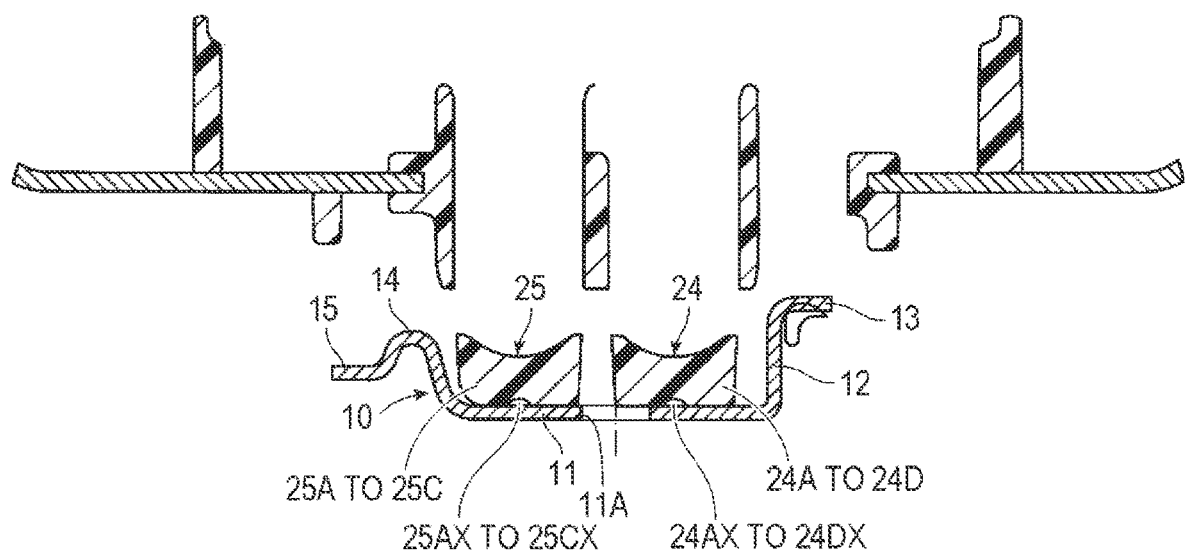
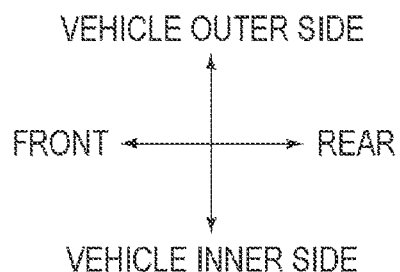

VEHICLE OUTER SIDE
FRONT ← → REAR
VEHICLE INNER SIDE

WINDOW REGULATOR

TECHNICAL FIELD

The present invention relates to a window regulator.

BACKGROUND ART

In a window regulator disclosed in Patent Literature 1, a slider including a sliding portion configured to elastically contact a guide surface of a guide portion of a guide rail is pulled with a wire to slide in a longitudinal direction of the guide surface. With this configuration, a window glass supported on the slider moves up and down.

The window regulator has a receiving holding portion formed by the guide portion of the guide rail and the sliding portion of the slider. The receiving holding portion is demarcated by a non-contact portion of the sliding portion and the guide portion, and receives and holds grease applied onto the guide surface upon sliding and unevenly distributes the held grease onto the guide surface in a width direction (a lateral direction) after the sliding portion has passed the guide surface. The receiving holding portion is formed at a sliding portion of an elastic lip of the slider such that grease is not removed from the guide surface and held on the guide surface of the guide rail.

CITATION LIST

Patent Literature

PATENT LITERATURE 1: JP-A-2017-133228

SUMMARY OF INVENTION

Problems to be Solved by Invention

However, the window regulator of Patent Literature 1 has such a problem that grease is spread in the width direction (the lateral direction) more than necessary by the elastic lip and does not remain on a portion to which the grease needs to be applied.

The typical window regulator has, not limited to Patent Literature 1, room for improvement in the difficulty of applying and holding a desired amount of grease at a desired location. For example, in the case of an insufficient grease supply, there is a probability that noise and damage are caused as a result of contact (friction) between the slider and the guide rail upon sliding thereof. On the other hand, in the case of an excessive grease supply (e.g., the case of applying grease to the entire area of the guide rail), there are probabilities that grease adheres to a hand of a worker, grease adheres to the window glass, and grease on a certain window regulator adheres to another window regulator when multiple window regulators are stacked on each other.

The present invention has been made based on the above-described problems. An object of the present invention is to provide a window regulator capable of achieving suitable grease application from a slider to a guide rail.

Solution to Problems

A window regulator according to the present embodiment incudes: a guide rail extending in a drive direction of a window glass; and a slider supporting the window glass and supported on the guide rail so as to slide in the drive direction, in which the guide rail has a grease application region extending in the drive direction, and the slider has multiple grease application portions provided along the drive direction to apply grease in a stepwise manner to the grease application region.

The multiple grease application portions may include a multistep claw portion having multiple claw portions protruding toward the grease application region.

At least one of the multiple claw portions of the multistep claw portion may be elastically deformable by contacting the grease application region, and in a free state of the multistep claw portion, a distance between each of the multiple claw portions and the grease application region may vary.

The multiple claw portions may have cutout portions facing the grease application region.

The grease application region may have an arrangement region for a wire configured to drive the slider in the drive direction, and the cutout portions may face the wire arrangement region.

The multiple grease application portions may include a grease release portion configured to release the grease from the grease application region and a grease return portion configured to return the grease, which has been released by the grease release portion, to the grease application region.

The grease release portion may have a tapered portion inclined apart from the grease application region, and the grease return portion may have a tapered portion inclined closer to the grease application region.

The multiple grease application portions may include a grease application wall protruding toward the grease application region.

The slider may have a guide rail support portion to be supported on the guide rail, and at least one of the multiple grease application portions may be provided at the guide rail support portion.

Effects of Invention

According to the present embodiment, the window regulator capable of achieving suitable grease application from the slider to the guide rail can be provided.

BRIEF DESCRIPTION OF DRAWINGS

FIG. 4 shows a view of the sectional shape of a guide rail.

FIGS. 7A and 7B show first sectional views along a P-P line or a Q-Q line of FIG. 5.

FIGS. 8A and 8B show second sectional views along the P-P line or the Q-Q line of FIG. 5.

FIG. 9 shows a sectional view along a Y-Y line of FIG. 5.

DESCRIPTION OF EMBODIMENTS

A window regulator 1 according to the present embodiment will be described in detail with reference to FIGS. 1 to 18. Directions (up, down, front, rear, vehicle inner side, vehicle outer side) in the following description are based on arrow directions shown in the figures.

Figure 1:
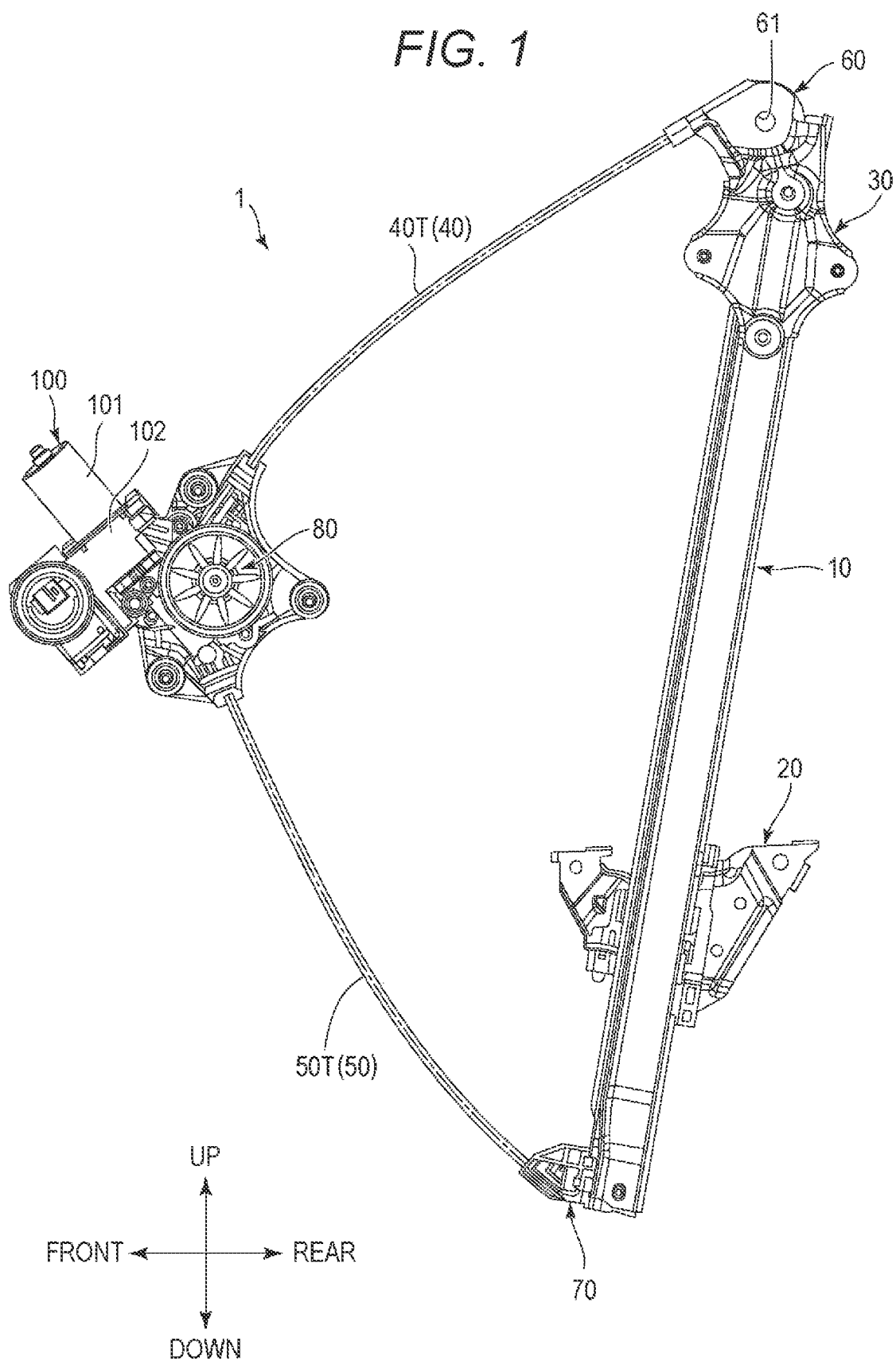
FIG. 1 shows a view of a window regulator according to the present embodiment from a vehicle inner side.
Figure 2:
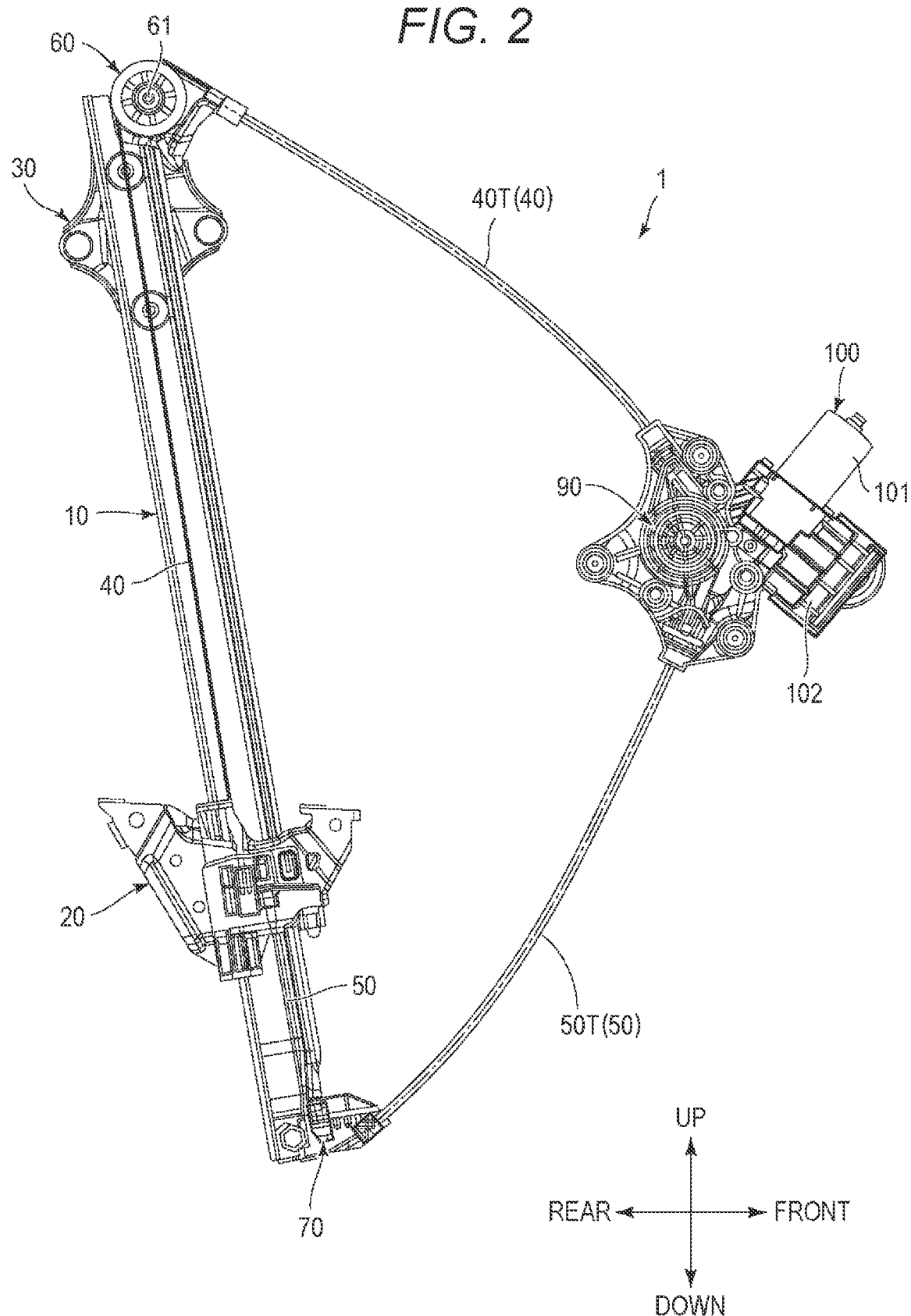
FIG. 2 shows a view of the window regulator according to the present embodiment from a vehicle outer side.

As shown in FIGS. 1 and 2, the window regulator 1 has a guide rail 10 and a slider 20. The guide rail 10 extends in an up-down direction as a drive direction of a window glass W (see FIG. 3). The slider 20 supports the window glass W, and is supported on the guide rail 10 so as to slide in the up-down direction (the drive direction). The guide rail 10 is fixed to a door panel 110a (see FIG. 3) of a vehicle through a bracket 30.

One end portion of each of a pair of wires 40, 50 configured to drive the slider 20 relative to the guide rail 10 in the up-down direction (the drive direction) is connected to the slider 20.

A guide pulley 60 is, at an upper end portion of the guide rail 10, rotatably supported by a rotary shaft 61 inserted into a rotary shaft hole of the guide pulley 60. The wire 40 extends from the slider 20 in an up direction along the guide rail 10, and is supported by a wire guide groove (not shown) formed on an outer peripheral surface of the guide pulley 60. The guide pulley 60 rotates about the rotary shaft 61 in association with forward-backward movement of the wire 40.

A guide member 70 is provided at a lower end portion of the guide rail 10. The wire 50 extends from the slider 20 in a down direction along the guide rail 10, and is guided to the guide member 70. The guide member 70 is fixed to the guide rail 10. The wire 50 is supported by a wire guide groove (not shown) formed at the guide member 70 so as to move back and forth.

The wire 40 extending out of the guide pulley 60 is inserted into a tubular outer tube 40T, and is wound around a drive drum 90 provided in a drum housing 80 to which the outer tube 40T is connected. The wire 50 extending out of the guide member 70 is inserted into a tubular outer tube 50T, and is wound around the drive drum 90 provided in the drum housing 80 to which the outer tube 50T is connected.

A motor unit 100 is attached to the drum housing 80. The motor unit 100 has a motor 101 and a gear box 102 including a reduction gear train. The reduction gear train transmits rotation of an output shaft of the motor 101 while reducing the speed of such rotation.

One end of the outer tube 40T is connected to the guide pulley 60, and the other end is connected to the drum housing 80. The wire 40 is movable back and forth in the outer tube 40T, both end positions of which are fixed. One end of the outer tube 50T is connected to the guide member 70, and the other end is connected to the drum housing 80. The wire 50 is movable back and forth in the outer tube 50T, both end positions of which are fixed.

The drum housing 80 is fixed to the door panel (not shown) of the vehicle. When the drive drum 90 is rotated forward and backward by drive force of the motor 101, the amount of winding of one of the wire 40 or the wire 50 around the drive drum 90 increases, and the other one of the wire 40 or the wire 50 is unwound from the drive drum 90. Due to a relationship between tightening and loosening of the wire 40 and the wire 50, the slider 20 moves along the guide rail 10. The window glass W moves up and down in association with movement of the slider 20.

Figure 3:
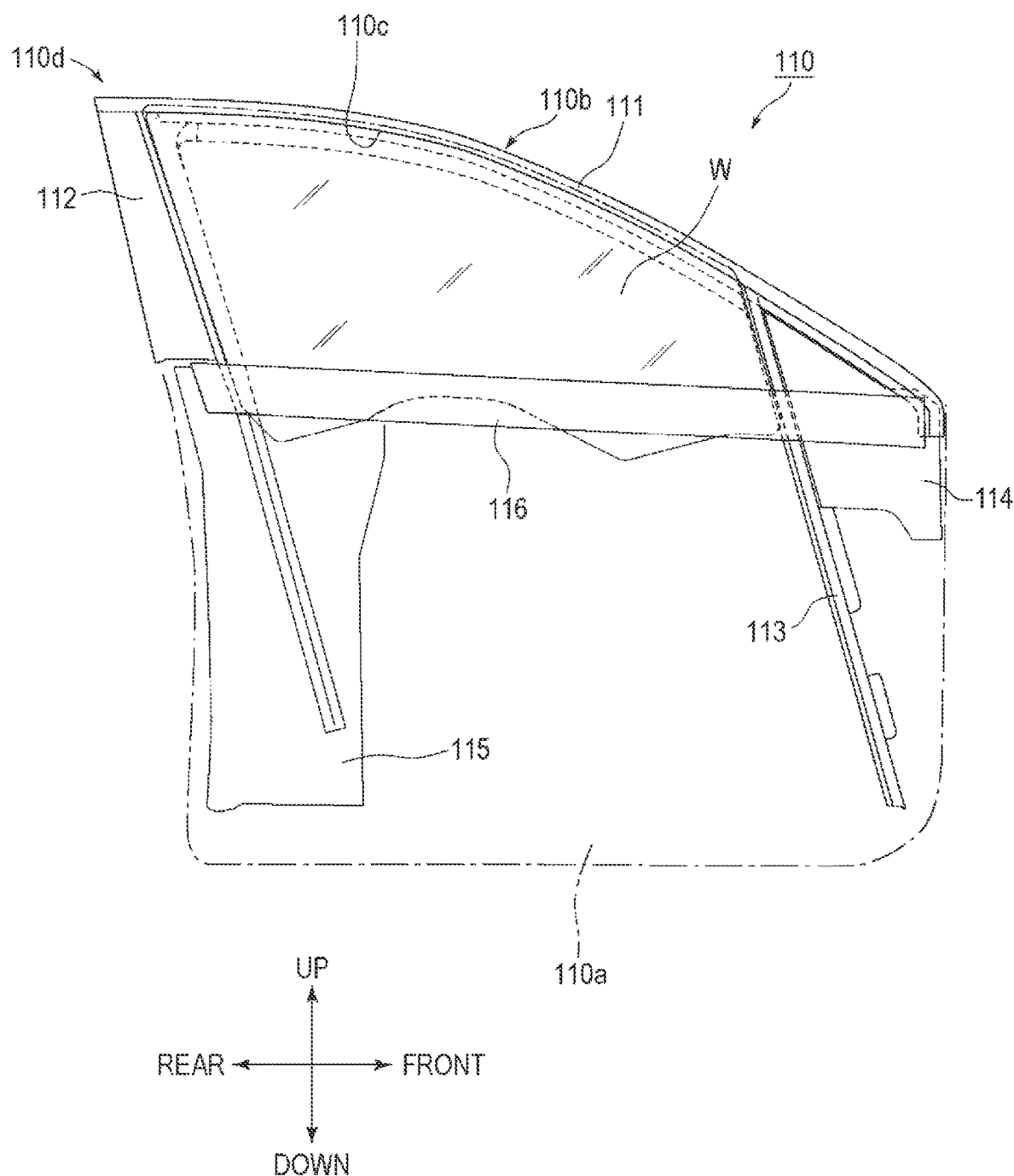
FIG. 3 shows a side view of a vehicle door equipped with the window regulator according to the present embodiment.

FIG. 3 is a side view of a vehicle door 110 equipped with the window regulator 1. The vehicle door 110 is a side door to be attached to the side of a right front seat of a vehicle body (not shown). The vehicle body is formed with a door opening (not shown) to be opened or closed by the vehicle door 110. The vehicle door 110 includes the door panel 110a (virtually indicated by a chain line) and a door frame 110b. A window opening 110c surrounded by an upper edge portion of the door panel 110a and the door frame 110b is formed.

The door frame 110b has an upper sash 111 positioned at an upper edge of the vehicle door 110, a standing-pillar sash 112, and a front sash 113. The standing-pillar sash 112 and the front sash 113 extend substantially in the up-down direction from the upper sash 111 to the door panel 110a. The standing-pillar sash 112 is positioned at a rearmost portion of the door frame 110b. An upper rear corner portion of the vehicle door 110 forms a door corner portion 110d at which a rear end of the upper sash 111 and an upper end of the standing-pillar sash 112 cross each other. At the door corner portion 110d, the rear end of the upper sash 111 and the upper end of the standing-pillar sash 112 are connected to each other through a connection member. The standing-pillar sash 112 and the front sash 113 extend substantially parallel with each other. The standing-pillar sash 112 forms a rear edge of the window opening 110c. The front sash 113 forms a front edge of the window opening 110c. Moreover, the upper sash 111 forms an upper edge of the window opening 110c.

The standing-pillar sash 112 extends downwardly (diagonally downwardly) from the door corner portion 110d, and is inserted into a space inside the door panel. The upper sash 111 extends forward from the door corner portion 110d, curves downwardly from the middle as extending forward, and reaches the space inside the door panel. The front sash 113 extends downwardly (diagonally downwardly) from a middle position of the upper sash 111, and is inserted into the space inside the door panel. Each of the upper sash 111, the standing-pillar sash 112, and the front sash 113 is fixed to the door panel 110a in the space inside the door panel.

In the space inside the door panel, a mirror bracket 114 is arranged at a front portion, and a lock bracket 115 is arranged at a rear portion. Each of the mirror bracket 114 and the lock bracket 115 is fixed to the door panel 110a. The front sash 113 is fixed to the mirror bracket 114. The standing-pillar sash 112 is fixed to the lock bracket 115. Part of the mirror bracket 114 has a shape protruding upwardly with respect to the door panel 110a and fitted in a triangular space between the upper sash 111 and the front sash 113. A door mirror (not shown) and the like are attached to such a portion of the mirror bracket 114. A door lock mechanism (not shown) and the like are attached to the lock bracket 115.

A beltline reinforcement 116 extending in a front-rear direction is arranged in the vicinity of an upper edge of the space inside the door panel. Although not shown in the figure, the beltline reinforcement 116 includes an inner reinforcement positioned on the vehicle inner side and an outer reinforcement positioned on the vehicle outer side. Of the inner reinforcement, a front end is fixed to the mirror bracket 114, and a rear end is fixed to the lock bracket 115.

The window glass W configured to move up and down along the standing-pillar sash 112 and the front sash 113 to open or close the window opening 110c is provided. The window glass W is moved up and down between a fully-closed position (a position in FIG. 1) and a fully-open position by the window regulator 1. At the fully-closed position, an upper edge of the window glass W reaches the upper sash 111. The window glass W having moved down to the fully-closed position from the fully-open position is housed in the space inside the door panel.

A detailed structure of the slider 20 and the structure for supporting the slider 20 on the guide rail 10 will be described with reference to FIGS. 4 to 16.

FIG. 4 is a view showing the sectional shape of the guide rail 10. The guide rail 10 has, as viewed in a section in a longitudinal direction, a main wall portion 11 extending in the front-rear direction, a side wall portion 12 extending from a rear end portion of the main wall portion 11 to the vehicle outer side, a distant wall portion 13 extending backwardly from a vehicle-outer end portion of the side wall portion 12, a curved wall portion 14 folded back to the vehicle inner side after having extended from a front end portion of the main wall portion 11 to the vehicle outer side, and a distant wall portion 15 extending forward from the curved wall portion 14. Note that the sectional shape of the guide rail 10 is not limited to that shown in FIG. 4 and various design changes can be made. For example, at least one (at least part) of the side wall portion 12, the distant wall portion 13, the curved wall portion 14, or the distant wall portion 15 may be omitted.

The guide rail 10 has two (two lines of) grease application regions Ga. Two (two lines of) grease application regions Ga are positioned on a vehicle-outer surface of the main wall portion 11, and extend in the up-down direction (the drive direction) as a direction perpendicular to the plane of paper of FIG. 4. Two grease application regions Ga each correspond to the wire 40 and the wire 50. Specifically, portions of two grease application regions Ga corresponding to the wire 40 and the wire 50 form arrangement regions Gb for the wire 40 and the wire 50. Grease G is applied to the grease application regions Ga (specifically, the arrangement regions Gb for the wire 40 and the wire 50), and therefore, prevents noise or damage due to contact (friction) of the wire 40 and the wire 50 with the main wall portion 11 of the guide rail 10 upon sliding of the slider 20 relative to the guide rail 10. FIG. 4 shows a state in which the grease G is applied to the arrangement regions Gb of the guide rail 10 for the wire 40 and the wire 50 and no grease G is applied to portions of the grease application regions Ga of the guide rail 10 other than the arrangement regions Gb for the wire 40 and the wire 50. However, the grease G may be applied to the entirety of the grease application regions Ga. Note that the grease application regions Ga of the guide rail 10 and the arrangement regions Gb of the guide rail 10 for the wire 40 and the wire 50 are not necessarily formed straight in the up-down direction (the drive direction) and various design changes can be made.

Figure 5:
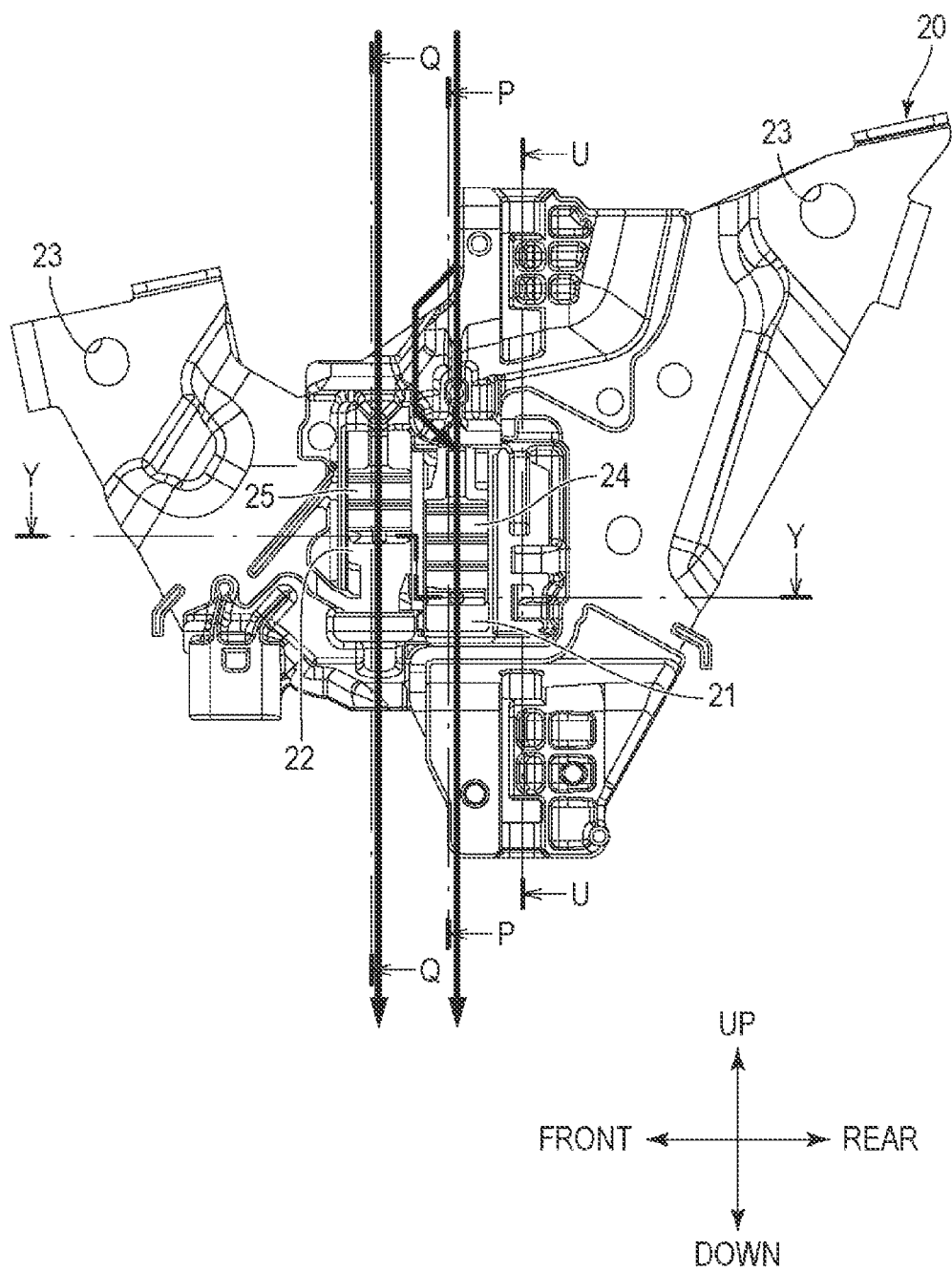
FIG. 5 shows a view of a slider from the vehicle inner side.
Figure 6:
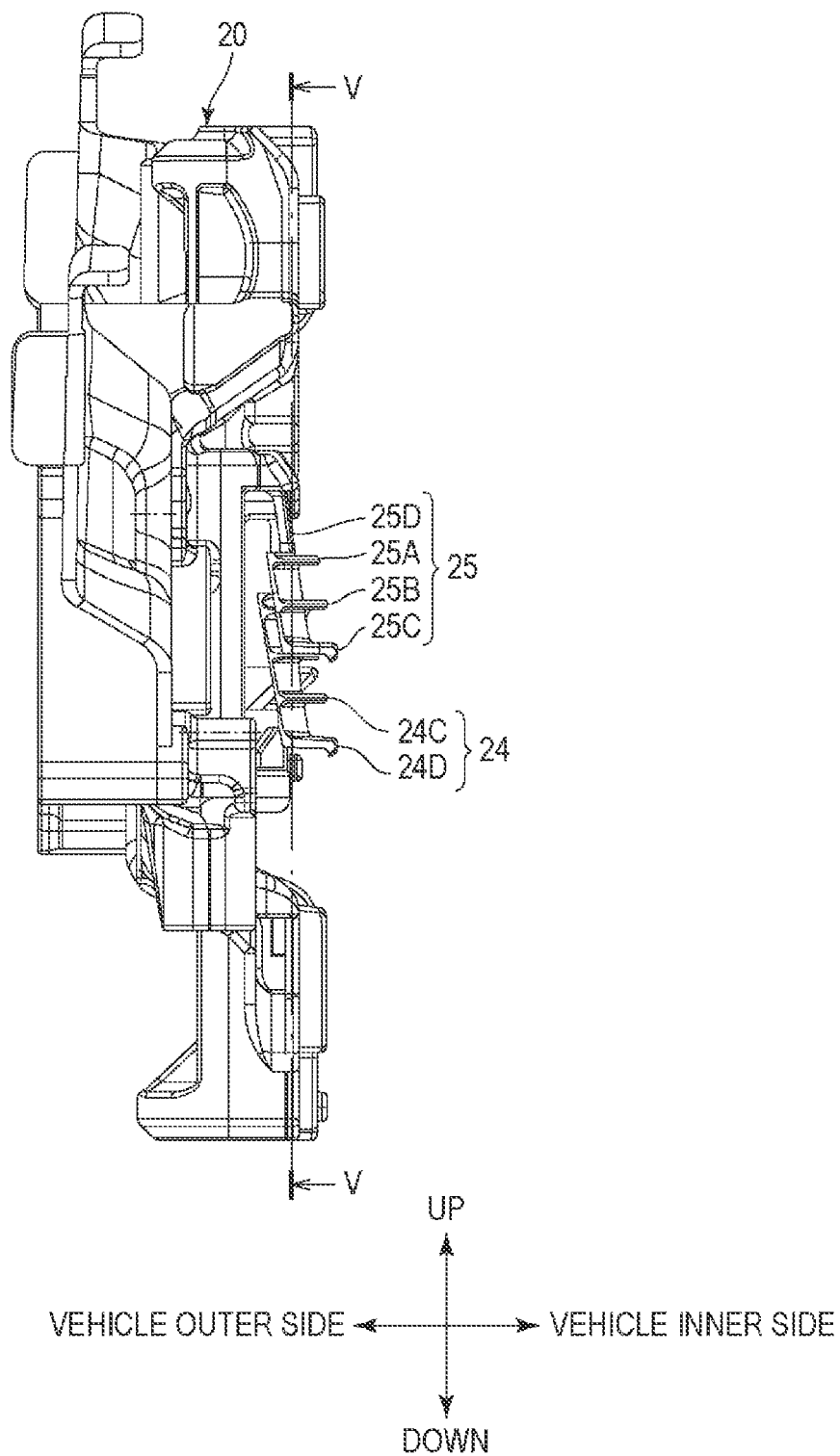
FIG. 6 shows a side view of the slider.

FIG. 5 is a view of the slider 20 from the vehicle inner side. FIG. 6 is a side view of the slider 20. As shown in FIG. 5, the slider 20 has a wire end housing portion 21 and a wire end housing portion 22. The wire end housing portion 21 houses a wire end (not shown) at the end portion of the wire 40. The wire end housing portion 22 houses a wire end (not shown) at the end portion of the wire 50. The wire end of the wire 40 is provided with a biasing section such as a spring. The wire end of the wire 40 is housed in the wire end housing portion 21 in a biasing section compressed state, and in this manner, the wire 40 is tensioned. The wire end of the wire 50 is provided with a biasing section such as a spring. The wire end of the wire 50 is housed in the wire end housing portion 22 in a biasing section compressed state, and in this manner, the wire 50 is tensioned. Moreover, a bolt insertion hole 23 is formed at the slider 20. A fastening bolt for fastening the window glass W to the slider 20 is inserted into the bolt insertion hole 23.

FIGS. 7 and 8 show first and second sectional views along a P-P line or a Q-Q line of FIG. 5. FIGS. 7A and 8A are sectional views along the P-P line of FIG. 5, and FIGS. 7B and 8B are sectional views along the Q-Q line of FIG. 5.

As shown in FIGS. 7A, 8A and the like, the slider 20 has a multistep claw portion 24. The multistep claw portion 24 supplies the grease G to opposing surfaces of the guide rail 10 and the wire 40. The multistep claw portion 24 is formed so as to fit in the wire end housing portion 21 (overlap with the wire end housing portion 21 in a vehicle width direction). Thus, upon molding of the slider 20, a pair of dies configured to move in a contact-separation direction does not have to move in a direction perpendicular to the contact-separation direction (a so-called slideless type can be used).

The multistep claw portion 24 has four claw portions 24A, 24B, 24C, 24D protruding toward the grease application region Ga of the guide rail 10 corresponding to the wire 40. A grease storage room for storing the grease G is formed between adjacent ones of the four claw portions 24A to 24D (between the claw portion 24A and the claw portion 24B, between the claw portion 24B and the claw portion 24C, between the claw portion 24C and the claw portion 24D).

As shown in FIG. 8A, at least one (the claw portion 24D in an example of FIG. 8A) of the four claw portions 24A to 24D of the multistep claw portion 24 is elastically deformable by contact with the grease application region Ga of the guide rail 10 corresponding to the wire 40 (an inwardly-positioned state). Specifically, the multistep claw portion 24 has a base bending portion 24E positioned at the base of the four claw portions 24A to 24D. The multistep claw portion 24 is elastically deformable by bending of the base bending portion 24E. In the elastically-deformed state (the inwardly-positioned state) of FIG. 8A, the multistep claw portion 24 (four claw portions 24A to 24D) and a grease application protrusion 24F and a grease application wall 24G positioned thereabove apply and spread the grease G in a stepwise manner such that the grease G does not spread beyond the grease application region Ga (the arrangement region Gb) of the guide rail 10 corresponding to the wire 40.

As shown in FIG. 7A, in a free state (an outwardly-positioned state) of the multistep claw portion 24, a distance between each of the four claw portions 24A to 24D and the grease application region Ga of the guide rail 10 corresponding to the wire 40 varies. Specifically, in the free state of the multistep claw portion 24, the distance between the claw portion 24A and the grease application region Ga is the longest, the distance between the claw portion 24B and the grease application region Ga is the second longest, the distance between the claw portion 24C and the grease application region Ga is the third longest, and the distance between the claw portion 24D and the grease application region Ga is the shortest (in an example of FIG. 7A, these portions slightly contact each other). In the free state (the outwardly-positioned state) of FIG. 7A, the claw portion 24D constantly contacting the grease application region Ga (the arrangement region Gb) of the guide rail 10 corresponding to the wire 40 applies and spreads the grease G such that the grease G does not spread beyond the grease application region Ga (the arrangement region Gb) of the guide rail 10 corresponding to the wire 40.

Figure 10:
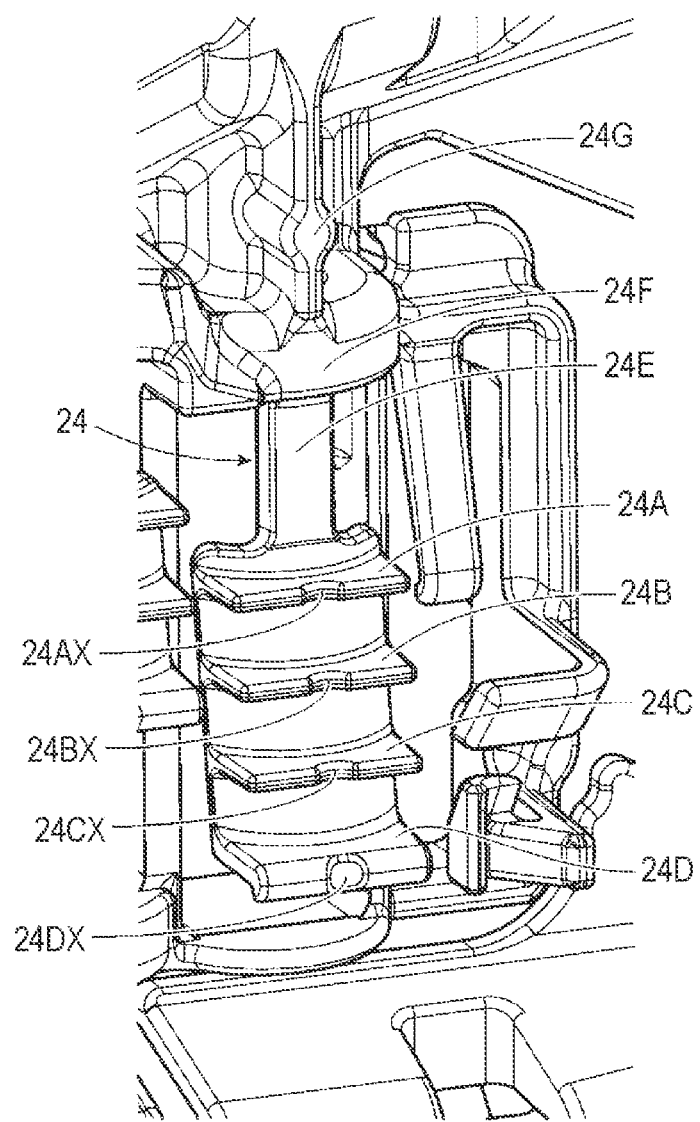
FIG. 10 shows an enlarged perspective view of a detailed structure of a multistep claw portion.

FIG. 10 is an enlarged perspective view showing a detailed structure of the multistep claw portion 24. As shown in FIG. 10, the four claw portions 24A to 24D of the multistep claw portion 24 have cutout portions 24AX to 24DX facing the grease application region Ga of the guide rail 10 corresponding to the wire 40. Specifically, the cutout portions 24AX to 24DX correspond to the arrangement region Gb of the guide rail 10 for the wire 40. For example, in a case where the four claw portions 24A to 24D of the multistep claw portion 24 apply the grease G to the grease application region Ga of the guide rail 10 corresponding to the wire 40, the grease G applied to the arrangement region Gb of the guide rail 10 for the wire 40 remains on the arrangement region Gb by the cutout portions 24AX to 24DX, and almost no grease G spreads beyond the arrangement region Gb. Even if the grease G applied to the arrangement region Gb of the guide rail 10 for the wire 40 spreads beyond the arrangement region Gb, the grease G is newly supplied from the grease application region Ga to the arrangement region Gb (the grease G never runs out on the arrangement region Gb).

As shown in FIGS. 7B, 8B and the like, the slider 20 has a multistep claw portion 25. The multistep claw portion 25 supplies grease G to opposing surfaces of the guide rail 10 and the wire 50. The multistep claw portion 25 is formed so as to fit in the wire end housing portion 22 (overlap with the wire end housing portion 22 in the vehicle width direction). Thus, upon molding of the slider 20, one of the pair of dies arranged in a molding direction and a direction perpendicular to the molding direction can be omitted (the so-called slideless type can be used).

The multistep claw portion 25 has three claw portions 25A, 25B, 25C protruding toward the grease application region Ga of the guide rail 10 corresponding to the wire 50. A grease storage room for storing the grease G is formed between adjacent ones of the three claw portions 25A to 25C (between the claw portion 25A and the claw portion 25B, between the claw portion 25B and the claw portion 25C).

As shown in FIG. 8B, at least one (the claw portions 25A to 25C in an example of FIG. 8B) of the three claw portions 25A to 25C of the multistep claw portion 25 is elastically deformable by contact with the grease application region Ga of the guide rail 10 corresponding to the wire 50 (an inwardly-positioned state). Specifically, the multistep claw portion 25 has a base bending portion 25D positioned at the base of the three claw portions 25A to 25C. The multistep claw portion 25 is elastically deformable by bending of the base bending portion 25D. In the elastically-deformed state (the inwardly-positioned state) of FIG. 8B, the multistep claw portion 25 (three claw portions 25A to 25C) and a grease application protrusion 25E positioned thereabove apply and spread the grease G in a stepwise manner such that the grease G does not spread beyond the grease application region Ga (the arrangement region Gb) of the guide rail 10 corresponding to the wire 50.

As shown in FIG. 7B, in a free state (an outwardly-positioned state) of the multistep claw portion 25, a distance between each of the three claw portions 25A to 25C and the grease application region Ga of the guide rail 10 corresponding to the wire 50 varies. Specifically, in the free state of the multistep claw portion 25, the distance between the claw portion 25A and the grease application region Ga is the longest, the distance between the claw portion 25B and the grease application region Ga is the second longest, and the distance between the claw portion 25C and the grease application region Ga is the shortest (in an example of FIG. 7B, these portions slightly contact each other). In the free state (the outwardly-positioned state) of FIG. 7B, the claw portion 25C constantly contacting the grease application region Ga (the arrangement region Gb) of the guide rail 10 corresponding to the wire 50 applies and spreads the grease G such that the grease G does not spread beyond the grease application region Ga (the arrangement region Gb) of the guide rail 10 corresponding to the wire 50.

As in the cutout portions 24AX to 24DX of the four claw portions 24A to 24D of the multistep claw portion 24, the three claw portions 25A to 25C of the multistep claw portion 25 have cutout portions 25AX to 25CX (see FIG. 9) facing the grease application region Ga of the guide rail 10 corresponding to the wire 50. Specifically, the cutout portions 25AX to 25CX correspond to the arrangement region Gb of the guide rail 10 for the wire 50. For example, in a case where the three claw portions 25A to 25C of the multistep claw portion 25 apply the grease G to the grease application region Ga of the guide rail 10 corresponding to the wire 50, the grease G applied to the arrangement region Gb of the guide rail 10 for the wire 50 remains on the arrangement region Gb by the cutout portions 25AX to 25CX, and almost no grease G spreads beyond the arrangement region Gb. Even if the grease G applied to the arrangement region Gb of the guide rail 10 for the wire 50 spreads beyond the arrangement region Gb, the grease G is newly supplied from the grease application region Ga to the arrangement region Gb (the grease G never runs out on the arrangement region Gb).

FIG. 9 is a sectional view along a Y-Y line of FIG. 5. As shown in FIG. 9, a through-hole 11A is formed at the main wall portion 11 of the guide rail 10. Various parameters of the multistep claw portions 24, 25, such as shapes, sizes, and arrangements, are set such that the multistep claw portions 24, 25 are not caught by the through-hole 11A and are not dropped in the through-hole 11A. Moreover, the vicinity (portions contacting the multistep claw portions 24, 25) of the through-hole 11A of the main wall portion 11 of the guide rail 10 is formed with a press droop surface, and therefore, the interference (catching) of the multistep claw portions 24, 25 with an edge portion of the through-hole 11A is prevented.

Figure 11A:
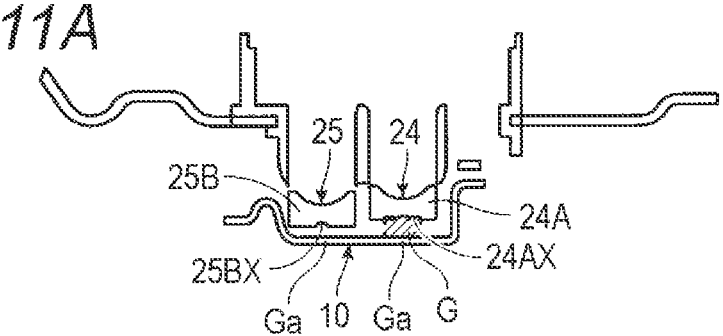
FIGS. 11A-11D show views in a state in which grease is applied and spread in a stepwise manner by means of the multistep claw portion of the slider.
Figure 11B:
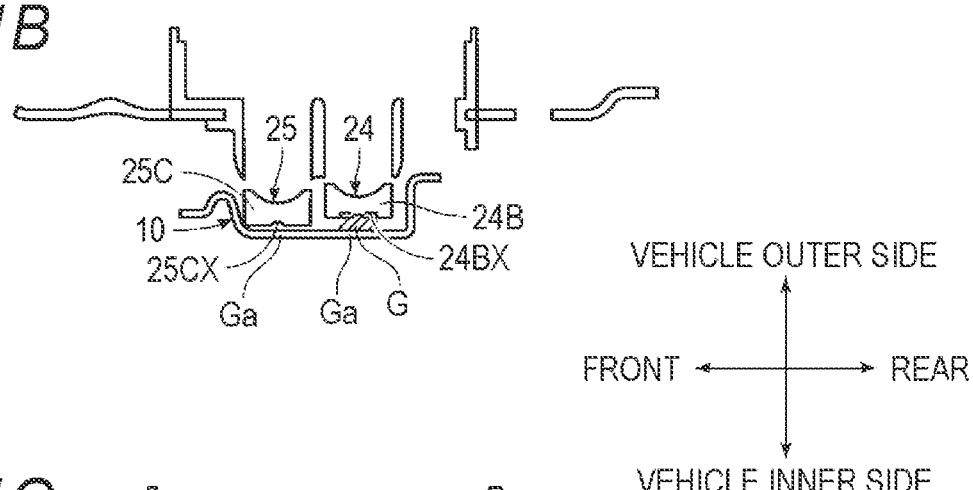
Figure 11C:
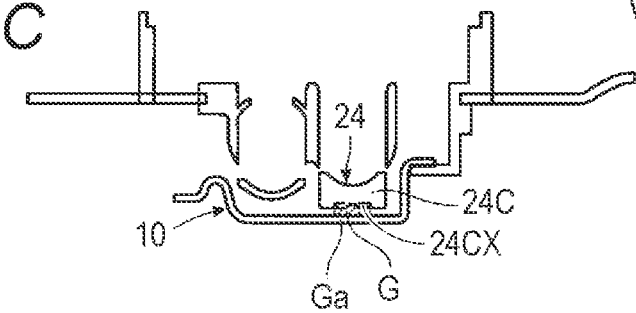
Figure 11D:
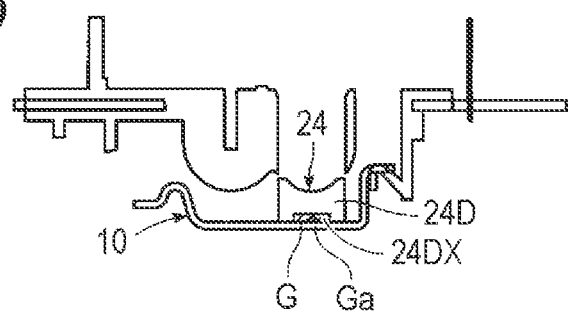

FIGS. 11A to 11D are views showing a state in which the grease G is applied and spread in a stepwise manner by means of the multistep claw portions 24, 25 of the slider 20. As shown in FIG. 11A, the distance between the claw portion 24A and the grease application region Ga is the longest. As shown in FIG. 11B, the distance between the claw portion 24B and the grease application region Ga is the second longest. As shown in FIG. 11C, the distance between the claw portion 24C and the grease application region Ga is the third longest. As shown in FIG. 11D, the distance between the claw portion 24D and the grease application region Ga is the shortest. Moreover, as shown in FIG. 11A, the distance between the claw portion 25B and the grease application region Ga is relatively longer. As shown in FIG. 11B, the distance between the claw portion 25C and the grease application region Ga is relatively shorter.

Thus, when the slider 20 slides in one direction relative to the guide rail 10 to apply the grease G by means of the multistep claw portion 24 of the slider 20, the motion of scraping and spreading an upper portion of the grease G by the claw portion 24A, the motion of scraping and spreading an upper portion of the grease G by the claw portion 24B, the motion of scraping and spreading an upper portion of the grease G by the claw portion 24C, and the motion of scraping and spreading an upper portion of the grease G by the claw portion 24D are sequentially made. Conversely, when the slider 20 slides in the other direction relative to the guide rail 10, at least the grease G passing in the cutout portions 24AX to 24DX remains applied to the arrangement region Gb of the guide rail 10 for the wire 40.

When the slider 20 slides in one direction relative to the guide rail 10 to apply the grease G by means of the multistep claw portion 25 of the slider 20, the motion of scraping and spreading an upper portion of the grease G by the claw portion 25A, the motion of scraping and spreading an upper portion of the grease G by the claw portion 25B, and the motion of scraping and spreading an upper portion of the grease G by the claw portion 25C are sequentially made. Conversely, when the slider 20 slides in the other direction relative to the guide rail 10, at least the grease G passing in the cutout portions 25AX to 25CX remains applied to the arrangement region Gb of the guide rail 10 for the wire 50.

Figure 12:
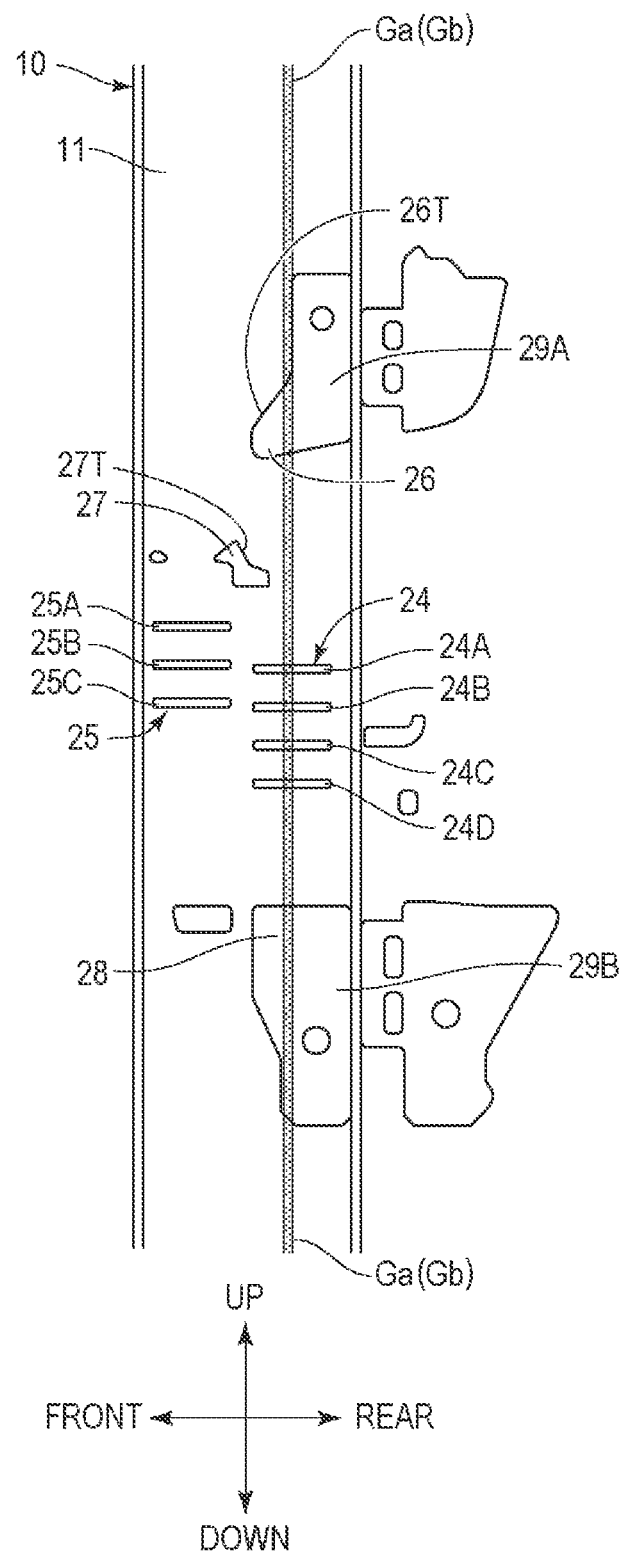
FIG. 12 shows a view of an upper wall, a return protrusion, the multistep claw portion, and a lower wall of the slider.

FIG. 12 is a view showing an upper wall (a grease release portion) 26, a return protrusion (a grease return portion) 27, the multistep claw portion 24, and a lower wall (a grease application wall) 28 of the slider 20. The upper wall 26, the return protrusion 27, the multistep claw portion 24, and the lower wall 28 are arranged in this order from above.

The upper wall 26 has the function of releasing the grease G forward from the grease application region Ga of the guide rail 10 corresponding to the wire 40 when the slider 20 slides relative to the guide rail 10. The upper wall 26 has a tapered portion 26T inclined apart from the grease application region Ga of the guide rail 10 corresponding to the wire 40.

The return protrusion 27 has the function of returning the grease G, which has been released forward by the upper wall 26, backward toward the grease application region Ga of the guide rail 10 corresponding to the wire 40 when the slider 20 slides relative to the guide rail 10. The return protrusion 27 has a tapered portion 27T inclined closer to the grease application region Ga of the guide rail 10 corresponding to the wire 40.

The multistep claw portion 24 has the four claw portions 24A to 24D protruding toward the grease application region Ga of the guide rail 10 corresponding to the wire 40. These four claw portions 24A to 24D apply the grease G in a stepwise manner to the grease application region Ga of the guide rail 10 corresponding to the wire 40.

The lower wall 28 protrudes toward the grease application region Ga of the guide rail 10 corresponding to the wire 40, and applies the grease G to the grease application region Ga of the guide rail 10 corresponding to the wire 40.

The slider 20 has guide rail support portions 29A, 29B to be supported on the guide rail 10. The guide rail support portions 29A, 29B hold, for example, at least part of the main wall portion 11, the side wall portion 12, the distant wall portion 13, the curved wall portion 14, and the distant wall portion 15 of the guide rail 10 therein to support such part. The upper wall 26 is formed at the guide rail support portion 29A, and the lower wall 28 is formed at the guide rail support portion 29B. Thus, the slider 20 has both the structure for supporting the guide rail 10 and the structure for applying the grease G, and therefore, not only compactification of the slider 20 but also an excellent layout property can be achieved.

Note that components equivalent to the upper wall 26, the return protrusion 27, and the lower wall 28 may be formed at the slider 20 for cooperation with the multistep claw portion 25 for the grease application region Ga of the guide rail 10 corresponding to the wire 50.

FIGS. 13A to 13D are views showing the steps of applying the grease G to the grease application region Ga of the guide rail 10 corresponding to the wire 40. FIGS. 13A to 13D show an example where after a clot of grease G has been applied to above the upper wall 26, the slider 20 slides upwardly relative to the guide rail 10 to apply the grease G to the grease application region Ga of the guide rail 10 corresponding to the wire 40.

Figure 13A:
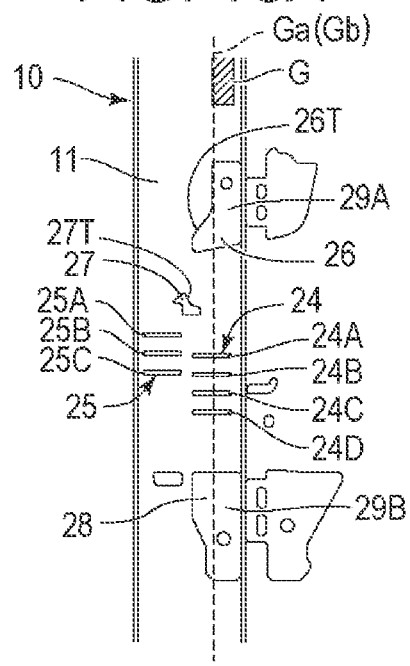
FIGS. 13A-13D show views of the steps of applying grease to a grease application region of the guide rail.

FIG. 13A shows an initial state before the slider 20 slides upwardly relative to the guide rail 10, and the clot of grease G is applied to above the upper wall 26.

Figure 13C:
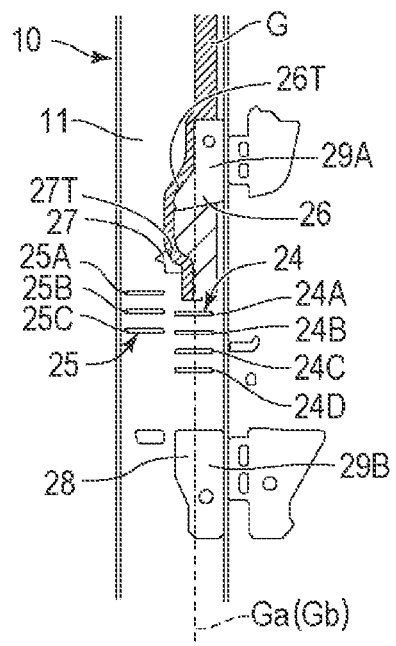
Figure 13B:
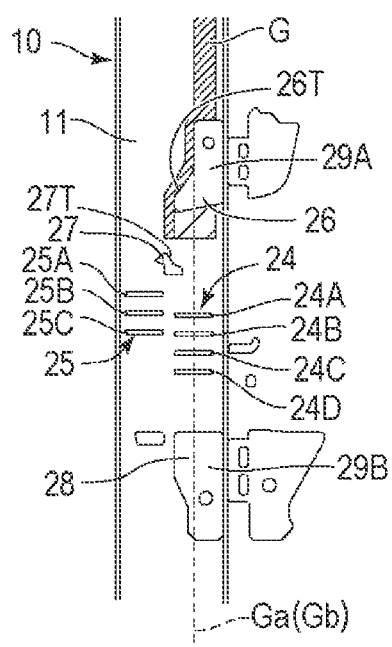

In FIG. 13B, as the slider 20 slides upwardly relative to the guide rail 10, the tapered portion 26T of the upper wall 26 comes into contact with the grease G, and the grease G is released forward from the grease application region Ga of the guide rail 10 corresponding to the wire 40.

In FIG. 13C, as the slider 20 slides upwardly relative to the guide rail 10, the tapered portion 27T of the return protrusion 27 comes into contact with the grease G, and the grease G is returned backward toward the grease application region Ga of the guide rail 10 corresponding to the wire 40.

Figure 13D:
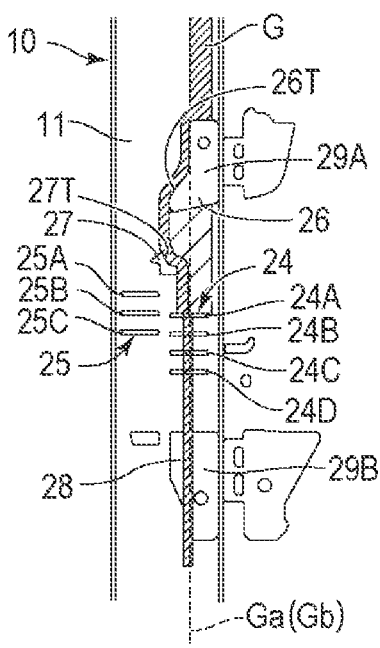

In FIG. 13D, as the slider 20 slides upwardly relative to the guide rail 10, the grease G is applied in a stepwise manner to the grease application region Ga of the guide rail 10 corresponding to the wire 40 by the four claw portions 24A to 24D of the multistep claw portion 24 and the lower wall 28.

The multistep claw portion 24, the grease application protrusion 24F, the grease application wall 24G, the multistep claw portion 25, the grease application protrusion 25E, the upper wall 26, the return protrusion 27, and the lower wall 28 described so far are provided along the up-down direction as the drive direction of the window glass W, and form "multiple grease application portions" configured to apply the grease G in a stepwise manner to the grease application regions Ga. For example, for the multistep claw portion 24 alone, the four claw portions 24A to 24D are equivalent to the "multiple grease application portions." For the multistep claw portion 25 alone, the three claw portions 25A to 25C are equivalent to the "multiple grease application portions." Moreover, a combination of at least two of the multistep claw portion 24, the grease application protrusion 24F, the grease application wall 24G, the upper wall 26, the return protrusion 27, and the lower wall 28 may be taken as the "multiple grease application portions." Examples of the combination of at least two portions may include a combination of the multistep claw portion 24, the upper wall 26, and the return protrusion 27, a combination of the multistep claw portion 24 and the lower wall 28, a combination of the multistep claw portion 24, the upper wall 26, the return protrusion 27, and the lower wall 28, a combination of the upper wall 26 and the return protrusion 27, and a combination of the upper wall 26, the return protrusion 27, and the lower wall 28. Stepwise grease application by the "multiple grease application portions" can achieve suitable grease application from the slider 20 to the guide rail 10.

When an attempt is made to decrease the vehicle-front-rear width of the guide rail 10, a guide rail holding portion of the slider 20 and a wire sliding portion overlap with each other in the vehicle up-down direction, and for this reason, there is a probability that grease applied for the wire sliding portion is shifted by the guide rail holding portion. On this point, the upper wall (the grease release portion) 26 and the return protrusion (the grease return portion) 27 are formed in the present embodiment, and therefore, even if the guide rail holding portion of the slider 20 and the wire sliding portion overlap with each other in the vehicle up-down direction, grease can be supplied to the wire sliding portion while avoiding the guide rail holding portion.

Figure 14A:
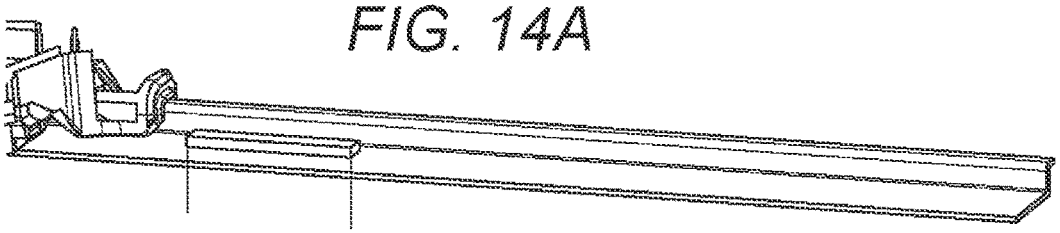
FIGS. 14A-14D show views of the image of the steps of spreading grease in an inwardly-positioned state.
Figure 14B:
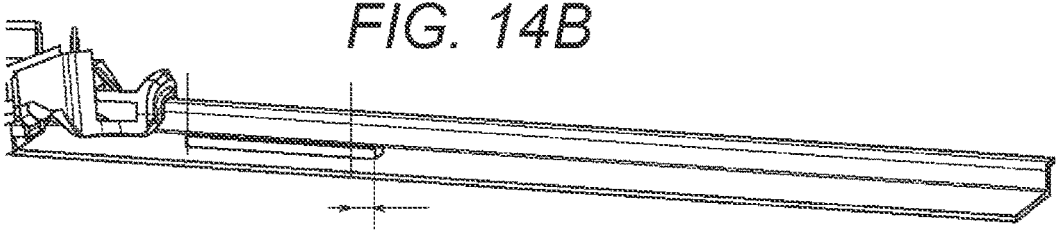
Figure 14C:
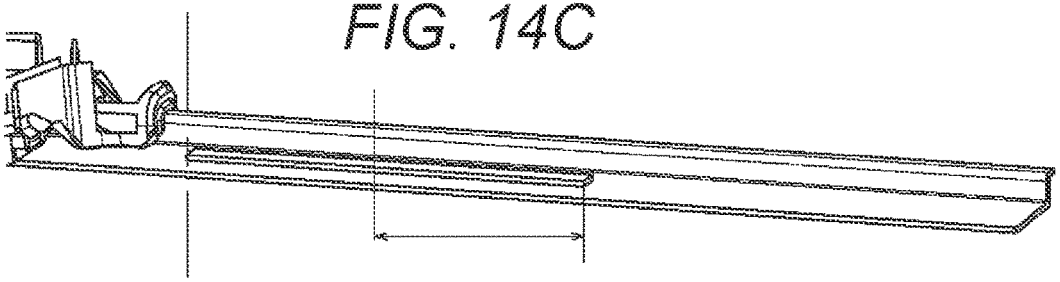
Figure 14D:
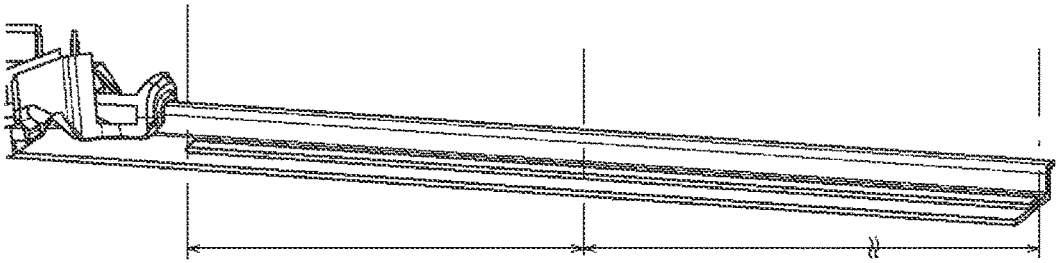

FIGS. 14A to 14D are views showing the image of the steps of spreading the grease G in the inwardly-positioned state. FIG. 14A shows an initial state before the grease G is spread. FIG. 14B shows a state in which the grease G is spread by the upper wall 26. FIG. 14C shows a state in which the grease G is spread by the return protrusion 27. FIG. 14D shows a state in which the grease G is spread by the multistep claw portion 24 (four claw portions 24A to 24D). In the inwardly-positioned state, the four claw portions 24A to 24D of the multistep claw portion 24 contact the grease application region Ga (the wire arrangement region Gb) of the guide rail 10. Thus, the amount of grease G spread by the multistep claw portion 24 (four claw portions 24A to 24D) is relatively greater.

Figure 15A:
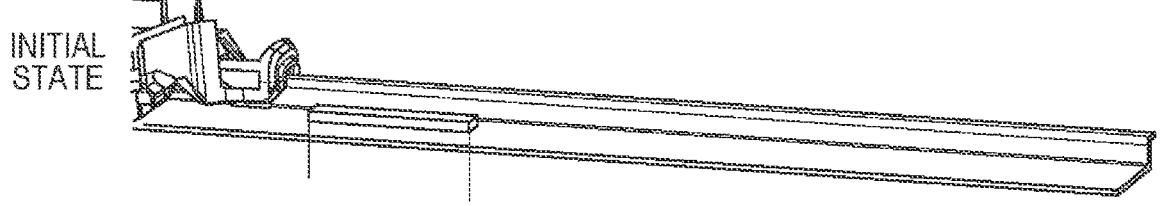
FIGS. 15A-15E show views of the image of the steps of spreading grease in an outwardly-positioned state.
Figure 15B:
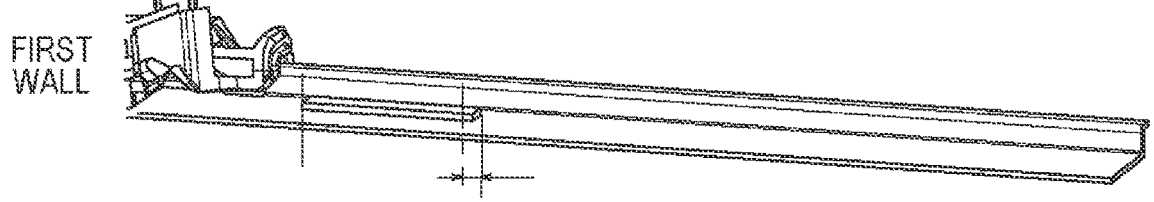
Figure 15C:
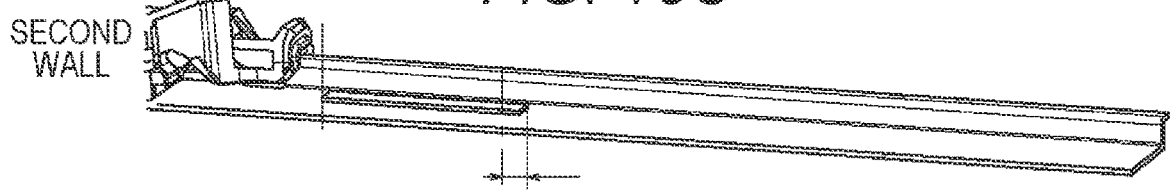
Figure 15D:
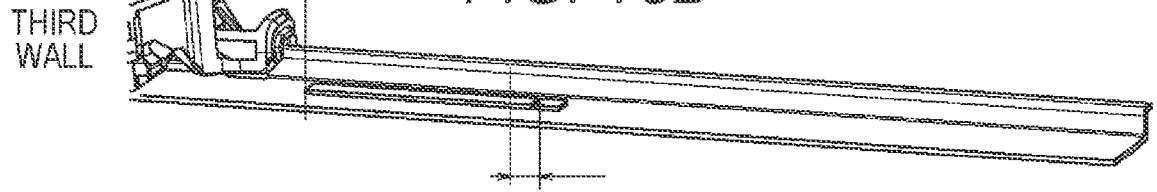
Figure 15E:
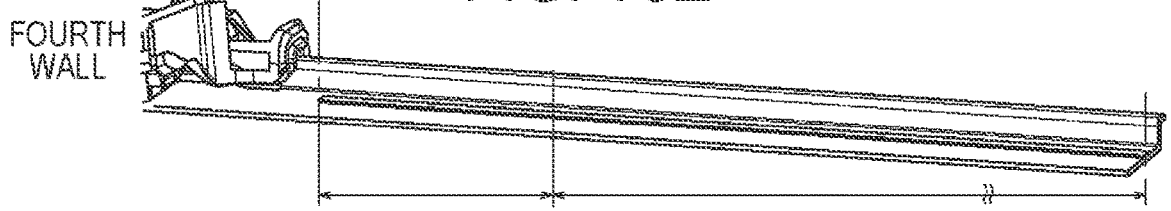

FIGS. 15A to 15E are views showing the image of the steps of spreading the grease G in the outwardly-positioned state. FIG. 15A shows an initial state before the grease G is spread. FIG. 15B shows a state in which the grease G is spread by the claw portion 24A (a first wall). FIG. 15C shows a state in which the grease G is spread by the claw portion 24B (a second wall). FIG. 15D shows a state in which the grease G is spread by the claw portion 24C (a third wall). FIG. 15E shows a state in which the grease G is spread by the claw portion 24D (a fourth wall). In the outwardly-positioned state, the claw portion 24D (the fourth wall) of the multistep claw portion 24 constantly contacts the grease application region Ga (the wire arrangement region Gb) of the guide rail 10. Thus, the amount of grease G spread by the claw portion 24D (the fourth wall) of the multistep claw portion 24 is relatively greater.

Figure 16:
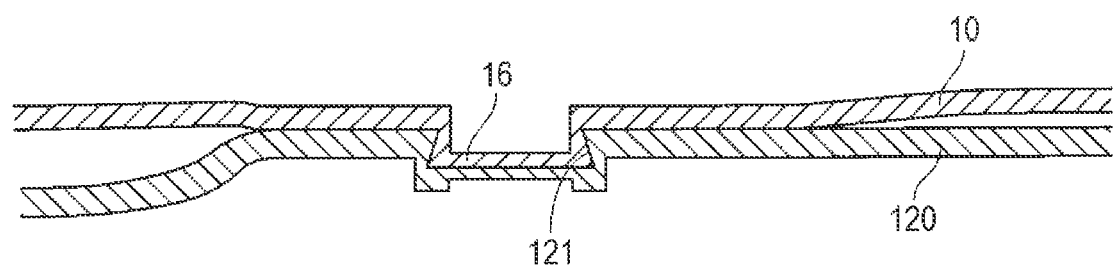
FIG. 16 shows a sectional view of a joint structure between the guide rail and a bracket.

FIG. 16 is a sectional view showing a joint structure between the guide rail 10 and a bracket 120. In the present embodiment, the slider 20 is provided with the multistep claw portions 24, 25. Thus, in a case where burring caulking is used for joint between the guide rail 10 and the bracket 120, there is a probability that the multistep claw portions 24, 25 are caught by a caulking portion. For this reason, in the present embodiment, TOX caulking is used for joint between the guide rail 10 and the bracket 120. In TOX caulking, a droop surface 121 is formed at the bracket 120, and a recessed portion 16 at which the guide rail 10 is recessed is formed inside the droop surface 121. The recessed portion 16 of the guide rail 10 and the droop surface 121 of the bracket 120 have such shapes, sizes, and arrangements that the multistep claw portions 24, 25 are not caught by the slider 20 and do not drop. Note that the above-described joint structure may be applied to a joint structure between the guide rail 10 and the door panel 110a of the vehicle door 110.

Figure 17:
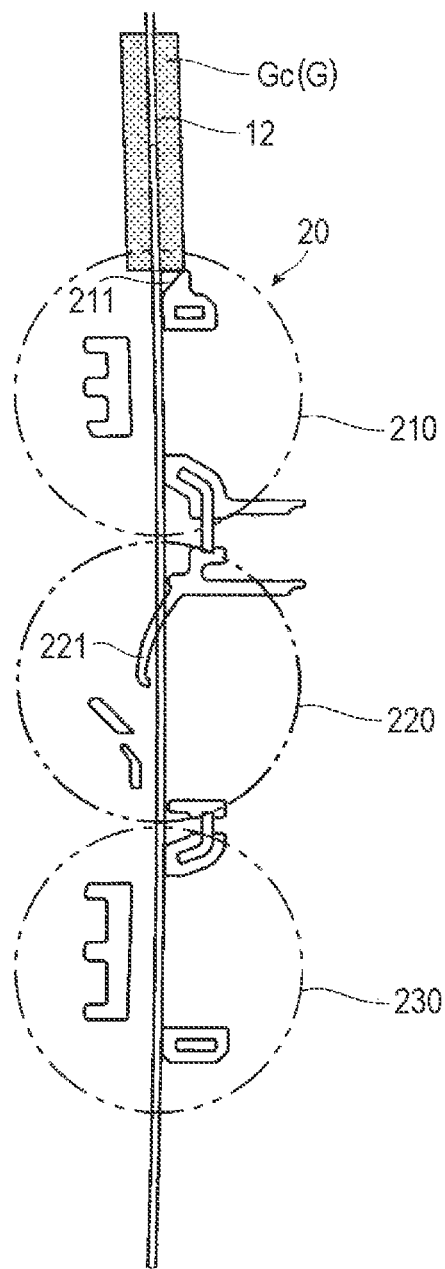
FIG. 17 shows a sectional view along a U-U line of FIG. 5.
Figure 18:
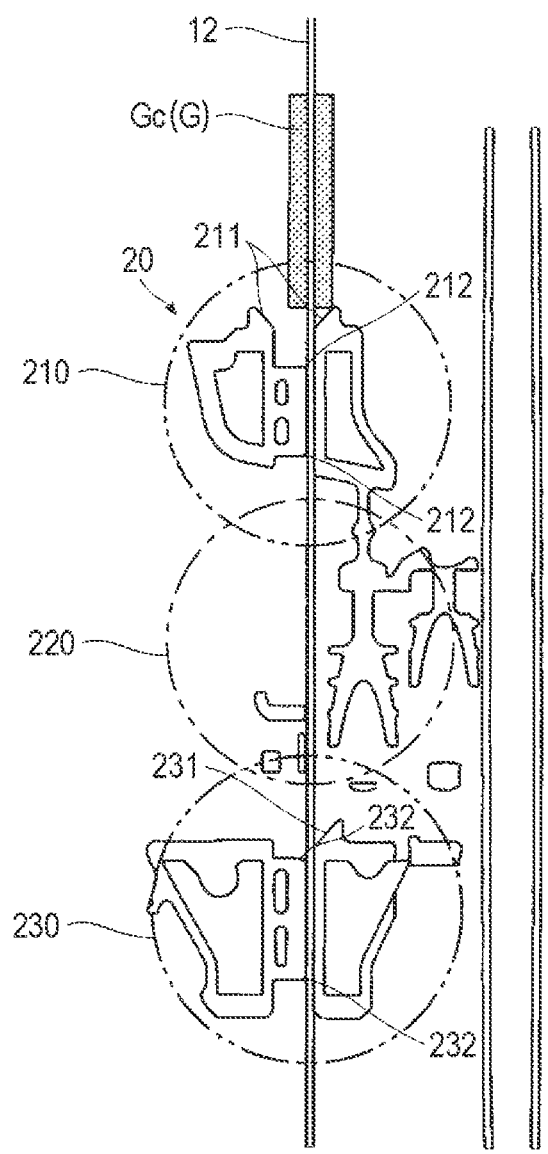
FIG. 18 shows a sectional view along a V-V line of FIG. 6.

In the case described as an example in the above-described embodiment (e.g., the embodiment shown in FIGS. 1 to 15), the grease application regions Ga are set on the main wall portion 11 of the guide rail 10, and the "multiple grease application portions" configured to apply grease in a stepwise manner to the grease application regions Ga are provided at the slider 20. A form may be also applicable, in which a grease application region Gc is set on the side wall portion 12 of the guide rail 10 and "multiple grease application portions" configured to apply grease in a stepwise manner to the grease application region Gc is provided at the slider 20. This variation will be specifically described with reference to FIGS. 17 and 18. FIG. 17 is a sectional view along a U-U line of FIG. 5. FIG. 18 is a sectional view along a V-V line of FIG. 6, and shows spreading of the grease G in the inwardly-positioned state.

FIGS. 17 and 18 assume a case where the grease G is applied (stored) in advance to part of the grease application region Gc set on an upper portion of the side wall portion 12 of the guide rail 10 and the slider 20 moves up along the guide rail 10. In this case, a multistage structure including a first grease application portion 210 (FIG. 18) formed at an upper shoe portion, a second grease application portion 220 (FIG. 17) formed as a resin spring structure, and a third grease application portion 230 (FIG. 18) formed at a lower shoe portion apply the grease G to the grease application region Gc set on the side wall portion 12 of the guide rail 10. That is, the guide rail 10 has the grease application region Gc extending in the up-down direction (the drive direction). The slider 20 has the first grease application portion 210, the second grease application portion 220, and the third grease application portion 230 as multiple grease application portions provided along the up-down direction (the drive direction) to apply the grease G in a stepwise manner to the grease application region Gc.

The first grease application portion 210 has, as a shoe tip end forming portion of the upper shoe portion, a tapered enclosing portion 211 of which the diameter increases toward above. The tapered enclosing portion 211 has the function of supplying the grease G to an intended portion (the grease application region Gc) and the function of preventing the grease G from leaking out of a sliding portion of a shoe. Moreover, the first grease application portion 210 has a chamfered portion 212 for guiding the grease G to the sliding portion of the shoe.

The second grease application portion 220 has a grease application claw portion (an elastic claw portion) 221 protruding toward the side wall portion 12 of the guide rail 10. The grease application claw portion 221 applies (spreads) the grease G to the grease application region Gc set on the upper portion of the side wall portion 12 of the guide rail 10 while bending by elastically contacting the side wall portion 12 of the guide rail 10.

The third grease application portion 230 has, a shoe tip end forming portion of the lower shoe portion, a tapered enclosing portion 231 of which the diameter increases toward above. The tapered enclosing portion 231 has the function of guiding and supplying the grease G to the lower shoe portion. Moreover, the third grease application portion 230 has a chamfered portion 232 for guiding the grease G to a sliding portion of a shoe.

Embodiments of the present invention are not limited to the above-described embodiment and the variation thereof, and various changes, replacements, and modifications may be made without departing from the gist of the technical idea of the present invention. Further, if the technical idea of the present invention can be achieved by other methods due to technical advance or other techniques derived therefrom, the technical idea of the present invention may be implemented by these other methods. Thus, the scope of the claims covers all embodiments considered to be included in the scope of the technical idea of the present invention.

The above-described embodiment has described, as an example, the case where the multistep claw portion 24 has the four claw portions 24A to 24D and the multistep claw portion 25 has the three claw portions 25A to 25C. There is the degree of freedom in the number of claw portions of the multistep claw portion, and various design changes can be made (it may only be required that the multistep claw portion has multiple claw portions).

The above-described embodiment has described, as an example, the case where the upper wall 26 and the lower wall 28 as some of the multiple grease application portions are formed at the guide rail support portion 29A and the guide rail support portion 29B. The other components of the multiple grease application portions may be formed at the guide rail support portion. That is, it may only be required that at least one of the multiple grease application portions is provided at the guide rail support portion.

The present international application claims priority based on Japanese Patent Application No. 2020-030155 as a Japanese patent application filed on Feb. 26, 2020. The entire disclosure of Japanese Patent Application No. 2020-030155 as the above-described Japanese patent application is incorporated herein by reference.

LIST OF REFERENCE SIGNS

1 Window Regulator
10 Guide Rail
11 Main Wall Portion
11A Through-Hole
12 Side Wall Portion
13 Distant Wall Portion
14 Curved Wall Portion
15 Distant Wall Portion
16 Recessed Portion
20 Slider
21, 22 Wire End Housing Portion
23 Bolt Insertion Hole
24 Multistep Claw Portion (Multiple Grease Application Portions)
24A, 24B, 24C, 24D Claw Portion
24AX, 24BX, 24CX, 24DX Cutout Portion
24E Base Bending Portion
24F Grease Application Protrusion (Multiple Grease Application Portions)
24G Grease Application Wall (Multiple Grease Application Portions)
25 Multistep Claw Portion (Multiple Grease Application Portions)
25A, 25B, 25C Claw Portion
25AX, 25BX, 25CX Cutout Portion
25D Base Bending Portion
25E Grease Application Protrusion (Multiple Grease Application Portions)
26 Upper Wall (Grease Release Portion, Multiple Grease Application Portions)
26T Tapered Portion
27 Return Protrusion (Grease Return Portion, Multiple Grease Application Portions)
27T Tapered Portion
28 Lower Wall (Grease Application Wall, Multiple Grease Application Portions)
29 Guide Rail Support Portion
30 Bracket
40, 50 Wire
40T, 50T Outer Tube
60 Guide Pulley
61 Rotary Shaft
70 Guide Member
80 Drum Housing
90 Drive Drum
100 Motor Unit
101 Motor
102 Gear Box
110 Vehicle Door
110a Door Panel
110b Door Frame
110c Window Opening
110d Door Corner Portion
111 Upper Sash
112 Standing-Pillar Sash
113 Front Sash
114 Mirror Bracket
115 Lock Bracket
116 Beltline Reinforcement
120 Bracket
121 Droop Surface
210 First Grease Application Portion (Multiple Grease Application Portions)
211 Tapered Enclosing Portion
212 Chamfered Portion
220 Second Grease Application Portion (Multiple Grease Application Portions)
221 Grease Application Claw Portion (Elastic Claw Portion)
230 Third Grease Application Portion (Multiple Grease Application Portions)
231 Tapered Enclosing Portion
232 Chamfered Portion
G Grease
Ga Grease Application Region
Gb Wire Arrangement Region
Gc Grease Application Region
W Window Glass

The invention claimed is:

1. A window regulator comprising:
a guide rail extending in a drive direction of a window glass; and
a slider supporting the window glass and supported on the guide rail so as to slide in the drive direction, wherein
the guide rail has a grease application region extending in the drive direction,
the slider has multiple grease application portions provided along the drive direction to apply grease in a stepwise manner to the grease application region,
the multiple grease application portions include a multistep claw portion having multiple claw elements protruding toward the grease application region,
at least one of the multiple claw elements of the multistep claw portion is elastically deformable by contacting the grease application region, and
in a free state of the multistep claw portion, a distance between each of the multiple claw elements and the grease application region varies.

2. A window regulator comprising:
a guide rail extending in a drive direction of a window glass; and
a slider supporting the window glass and supported on the guide rail so as to slide in the drive direction, wherein
the guide rail has a grease application region extending in the drive direction,
the slider has multiple grease application portions provided along the drive direction to apply grease in a stepwise manner to the grease application region,
the multiple grease application portions include a multistep claw portion having multiple claw elements protruding toward the grease application region, and
the multiple claw elements have cutout portions facing the grease application region.

3. The window regulator according to claim 2, wherein
the grease application region has a wire arrangement region for a wire configured to drive the slider in the drive direction, and
the cutout portions face the wire arrangement region.

4. A window regulator comprising:
a guide rail extending in a drive direction of a window glass; and
a slider supporting the window glass and supported on the guide rail so as to slide in the drive direction, wherein
the guide rail has a grease application region extending in the drive direction,
the slider has multiple grease application portions provided along the drive direction to apply grease in a stepwise manner to the grease application region,
the multiple grease application portions include a multi-step claw portion having multiple claw elements protruding toward the grease application region, and
the multiple grease application portions include a grease release portion configured to release the grease from the grease application region and a grease return portion configured to return the grease, which has been released by the grease release portion, to the grease application region.

5. The window regulator according to claim 4, wherein
the grease release portion has a tapered portion inclined apart from the grease application region, and
the grease return portion has a tapered portion inclined closer to the grease application region.

6. The window regulator according to claim 1, wherein
the multiple grease application portions include a grease application wall protruding toward the grease application region.

7. The window regulator according to claim 1, wherein
the slider has a guide rail support portion to be supported on the guide rail, and
at least one of the multiple grease application portions is provided at the guide rail support portion.

8. The window regulator according to claim 2, wherein
the multiple grease application portions include a grease application wall protruding toward the grease application region.

9. The window regulator according to claim 2, wherein
the slider has a guide rail support portion to be supported on the guide rail, and
at least one of the multiple grease application portions is provided at the guide rail support portion.

10. The window regulator according to claim 4, wherein
the multiple grease application portions include a grease application wall protruding toward the grease application region.

11. The window regulator according to claim 4, wherein
the slider has a guide rail support portion to be supported on the guide rail, and
at least one of the multiple grease application portions is provided at the guide rail support portion.

* * * * *